United States Patent [19]

Higuchi et al.

[11] 4,404,318

[45] Sep. 13, 1983

[54] PIGMENT DISPERSION

[75] Inventors: Tetsuo Higuchi; Teiitsu Takagi; Toshihide Fujitani; Yasuhiko Haruta, all of Hiratsuka, Japan

[73] Assignee: Kansai Paint Co., Ltd., Japan

[21] Appl. No.: 352,877

[22] Filed: Feb. 26, 1982

Related U.S. Application Data

[63] Continuation of Ser. No. 217,539, Dec. 17, 1980, abandoned.

[30] Foreign Application Priority Data

Dec. 29, 1979 [JP] Japan .................................. 54-172051
Dec. 29, 1979 [JP] Japan .................................. 54-172053

[51] Int. Cl.³ ............................................. C08L 67/00
[52] U.S. Cl. ................................. 524/588; 106/308 M
[58] Field of Search ................... 106/308 M; 524/588; 525/102, 342

[56] References Cited

U.S. PATENT DOCUMENTS 4,243,767 1/1981 Kaufman ............................ 525/102

FOREIGN PATENT DOCUMENTS 1328136 8/1973 United Kingdom .

Primary Examiner—Paul R. Michl
Attorney, Agent, or Firm—Wenderoth, Lind & Ponack

[57] ABSTRACT

In a pigment dispersion comprising a pigment, a dispersing agent and an organic dispersing medium, the improvement wherein the dispersing agent is the reaction product of an amino resin, an alkyd resin or an acrylic resin with a silane coupling agent, or the reaction product of both an alkyd resin or an acrylic resin and an amino resin with a silane coupling agent.

5 Claims, No Drawings

PIGMENT DISPERSION

This is a Rule 60 continuation of application Ser. No. 217,539, filed Dec. 17, 1980, now abandoned.

This invention relates to a pigment dispersion having superior pigment dispersibility and dispersion stability which is prepared by using a novel dispersing agent.

It is known that pigment-containing solution-type paints, inks, etc. undergo undesirable phenomena such as the difficulty of dispersing pigments during manufacture, the flocculation and sedimentation of pigments during storage and the consequent reduced color development, flooding, floating, reduced gloss, and discoloration of a paint surface. Various methods have been proposed in an attempt to solve these problems. They include, for example, (1) a method which comprises dispersing a pigment using a nonionic, anionic or cationic surface-active agent or a wetting agent such as an aliphatic polycarboxylic acid as an additive, (2) a method which comprises dispersing a pigment using a dual affinitive substance composed of a pigment affinitive component and a medium affinitive component as disclosed, for example, in British Pat. Nos. 1,108,261, 1,159,252 and 1,346,298, and (3) a method which involves reducing surface tension by adding a surface-active agent such as an alkylsilicone to prevent occurrence of pigment floating.

The aforesaid defects, however, have not been fully remedied by these prior known methods, but rather, the various additives used in these prior methods have resulted in secondary adverse effects on the performance and appearance of the resulting coated films.

It is an object of this invention therefore to provide a pigment dispersion in which the pigment can be dispersed easily with good stability without a deterioration in the performance and appearance of a coated film prepared therefrom.

In accordance with this invention, the above object is achieved by a pigment dispersion comprising a pigment, a dispersing agent and an organic dispersing medium, said dispersing agent being (1) the reaction product between an amino resin and a silane coupling agent, (2) the reaction product between an alkyd resin and a silane coupling agent, (3) the reaction product between an acrylic resin and a silane coupling agent, (4) the reaction product of an alkyd resin, an amino resin and a silane coupling agent, or (5) the reaction product of an acrylic resin, an amino resin and a silane coupling agent.

The silane coupling agent used in the synthesis of the dispersing agent used in this invention is an organofunctional silane represented by the following structural formula

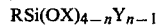

wherein n represents an integer of 1 to 3, X represents an alkyl group having 1 to 18 carbon atoms, a phenyl group or an alkoxyalkyl group of the formula —R'.OR" in which R' represents an alkyl group having 2 or 3 carbon atoms and R" represents an alkyl group having 1 to 18 carbon atoms, Y represents an alkyl group having 1 to 18 carbon atoms, and R represents an epoxy group, an amino group, a urea group, a mercapto group, a halogen atom or an organic group having an ethylenically unsaturated double bond.

Examples of suitable organofunctional silanes for use in this invention are as follows:

Silane compounds having an amino group, such as gamma-aminopropyltriethoxysilane, N-beta-(aminoethyl)gamma-aminopropyltrimethoxysilane and N-beta-(aminoethyl)gamma-propylmethyldimethoxysilane.

Silane compounds containing a urea group such as gamma-ureidopropyltriethoxysilane.

Silane compounds having a mercapto group, such as gamma-mercaptoethyltriethoxysilane and gamma-mercaptopropyltrimethoxysilane.

Silane compounds having an epoxy group such as gamma-glycidoxypropyl trimethoxysilane, gamma-glycidoxypropyl dimethylethoxysilane, gamma-glycidoxypropyl methyldiethoxysilane, and beta-(3,4-epoxycyclohexyl)ethyltrimethoxysilane.

Silane compounds having a halogen atom such as gamma-chloropropyltrimethoxysilane.

Silane compounds having an ethylenically unsaturated double bond, such as vinyltrimethoxysilane, vinyltriethoxysilane, vinyl tris(2-methoxyethoxy)silane, vinyltriacetoxysilane, vinyl triphenoxysilane and gamma-methacryloxypropyltrimethoxysilane.

These organofunctional silanes may be used singly or as a mixture of two or more.

The amino resin used in the synthesis of the dispersing agent used in this invention includes amino group-containing resins generally used as paint vehicles. Specific examples are condensation products between amino group-containing compounds such as urea, melamine or benzoguanamine and formaldehyde, and etherified amino resins resulting from modification of these condensates with alcohols such as n- or iso-butanol. Since the dispersing agent obtained by the reaction of the amino resin with the silane coupling agent can be cured by crosslinking as is the case with conventional amino resins, it has the advantage of not appreciably degrading the properties of a coated film even when it remains there.

The alkyd resin used in the synthesis of the dispersing agent in this invention denotes air drying or heat-curable ester-type polycondensation products which are generally used as paint vehicles. Examples include oil- or hydroxyl group-free monomeric fatty acid-modified alkyd resins, phenolic resin-modified alkyd resins, rosin-modified alkyd resins, and styrenated alkyd resins.

The acrylic resin used in the synthesis of the dispersing agent in this invention may be a polymer or copolymer of at least one unsaturated monomer exemplified below. Examples include polymers or copolymers of acrylic monomers, for example esters between (meth)acrylic acid and linear, branched or cyclic monoalcohols having 1 to 26 carbon atoms, hydroxyalkyl (meth)acrylates such as 2-hydroxyethyl (meth)acrylate, 2-hydroxymethyl (meth)acrylate or 2-hydroxypropyl (meth)acrylate, glycidyl (meth)acrylate, adducts of glycidyl (meth)acrylate with carboxylic acids having 1 to 26 carbon atoms, unsaturated amides such as (meth)acrylamide or N-$C_{1-4}$ alkylacrylamide, and (meth)acrylic acid; and copolymers of these acrylic monomers with polymerizable unsaturated monomers, for example polymerizable unsaturated nitriles such as (meth)acrylonitrile, ethylenically unsaturated aromatic compounds such as styrene, alpha-methylstyrene and vinyl-toluene, polymerizable carboxylic acids such as itaconic acid and maleic acid, other vinyl compounds such as vinyl acetate and vinyl chloride, and diene compounds such as butadiene and isoprene.

The dispersing agent of this invention is the reaction product of the silane coupling agent, amino resin, alkyd resin and acrylic resin in the following combinations.

Group A (2-reactant system)

(1) the silane coupling agent and the amino resin
(2) the silane coupling agent and the modified alkyd resin
(3) the silane coupling agent and the acrylic resin

Group B (3-reactant system)

(4) the silane coupling agent, the amino resin and the alkyd resin
(5) the silane coupling agent, the amino resin and the acrylic resin In preparing the dispersing agent of group A in accordance with this invention, it is preferred to react 1 to 100 parts by weight, preferably 2 to 50 parts by weight, of the silane coupling agent with 100 parts by weight of the amino resin, the alkyd resin or the acrylic resin.

In preparing the dispersing of group B, 1 to 100 parts by weight, preferably 2 to 50 parts by weight, of the silane coupling agent is used per 100 parts by weight of the alkyd-amino resin or the acrylic-amino resin which consists of 5 to 95% by weight of the alkyl resin or the acrylic resin and 95 to 5% by weight of the amino resin.

In both of the groups A and B, if the amount of the silane coupling agent is less than 1 part by weight, the amount of the alkoxysilane group absorbed to the pigment surface is so small that its adsorptive effect is reduced. On the other hand, if its amount exceeds 100 parts by weight, the amount of the amino resin, the alkyd resin, the acrylic resin, the amino-alkyd resin or the amino-acrylic resin to be solvated is small, and the stability of pigment dispersion is reduced.

The reaction temperature used in the synthesis of the dispersing agent is not particularly limited, but is preferably 50° to 120° C. The reaction can be controlled by the state of viscosity increase of the product during the course of the reaction. If desired, there can be used a reaction catalyst such as p-toluenesulfonic acid, phosphoric acid, a tertiary amine (e.g., triethylamine) or a quaternary ammonium salt (e.g., tetraethyl ammonium chloride). If the reaction proceeds excessively, the reaction of the alkoxysilane group takes place and gellation may occur. Hence, care must be taken in this regard.

In the synthesis of the dispersing agent of group B, the order of adding the individual components, i.e. the alkyd resin or the acrylic resin, the amino resin and the silane coupling agent, is not particularly limited. For example, the three reactants may be charged and reacted at the same time, or the alkyd resin or the acrylic resin may be first reacted with the amino resin, followed by reacting the product with the silane coupling agent. The latter is preferred because it serves to prevent gellation of the reaction product caused by the reaction of the alkoxysilane group.

The dispersion agent of this invention consists of the alkoxysilane group as a pigment-affinitive component and the amino resin, the alkyd resin, the acrylic resin, the amino-alkyd resin or the amino-acrylic resin to be solvated with a solvent in the dispersion as a medium-affinitive component. It is presumed that as a result of using this dispersing agent for the dispersion of a pigment, the alkoxysilane group reacts with, and is adsorbed to, the hydroxyl group (including adsorbed water) on the surface of the pigment and the remaining component is solvated with the solvent, and that consequently, the pigment particles are greatly stabilized in the dispersion and the storage stability of the resulting dispersion and the surface appearance of a coated film prepared therefrom are markedly improved.

The pigment used in this invention may be any of those commercially available for formulating paints, inks, plastics, etc. Examples include inorganic pigments, for example pigments composed mainly of elements such as carbon black and aluminum powder, and the oxides, sulfates, sulfides, chromates, silicates, hydroxides and carbonates of Zn, Pb, Ti, Sb, Cd, Fe, As, Sb, Mg, Al, Ba, Ca, Si, Co, and Cr; and organic pigments such as natural dye-type pigments, nitroso pigments, nitro pigments, azo pigments, phthalocyanine pigments, basic dye-type pigments, quinacridone red, quinacridone violet, perillene red, perillene scarlet, dioxazine violet and isoindolinone yellow. The preferred amount of the pigment is not more than 80% by weight based on the pigment dispersion. If it exceeds 80% by weight, the pigment dispersion tends to be difficult to handle because of increased viscosity. In selecting these pigments, it is desirable to exclude those which may induce an undesirable side-reaction with the above resins during the mixing operation.

The organic solvent used in this invention as the organic dispersing medium may be any organic solvent which does not react with the silane coupling agent. Examples include aromatic solvents such as xylene, toluene and solvent naphtha, aliphatic solvents such as hexane, mineral spirits and ethyl cyclohexane, and esters such as ethyl acetate, n-butyl acetate and ethylene glycol monoethyl ether acetate. Addition of an alcoholic solvent such as methyl alcohol, ethyl alcohol and n-butyl alcohol inhibits the excessive reaction of the alkoxysilane group and serves to prevent gellation of the reaction product.

A pigment dispersion having fine pigment particles dispersed therein stably can be easily prepared by diluting the above dispersing agent with the organic dispersing medium, mixing a pigment, and dispersing it in the mixture by a known method. In preparing the dispersion, a known resin for paint vehicles can be mixed with the pigment dispersion of this invention. Examples of such resins are amino resins, alkyd resins, polyester resins, epoxy resins, acrylic resins, polyvinyl chloride, polyvinyl acetate, polystyrene, polybutadiene, rosin, ester gum and cellulose derivatives. In order to obtain finely dispersed pigment dispersion, the proportion of the pigment dispersing agent is preferably at least 1% by weight based on the resin solids content. The amount of the dispersing agent is increased for a pigment having a high specific surface area such as carbon black, and is decreased for a pigment having a low specific surface area such as titanium dioxide.

The dispersing operation may be carried out by using various devices such as a shaker, roll mill, colloid mill, ball mill, sand grinder and attriter.

The flooding and floating phenomena can be further inhibited by adding a surface tension controlling agent such as a silicone to the pigment dispersion of this invention.

The following examples illustrate the present invention more specifically. All parts and percentages in these examples are by weight unless otherwise specified.

EXAMPLE 1

100 Parts of a 60% solution of isobutanol-modified melamine resin (A) and 6 parts of a silane coupling agent, KBM-603 [a tradename for N-beta-(aminoethyl)-gamma-aminopropyltrimethoxysilane manufactured by Shinetsu Chemical Industry Co., Ltd., Japan] were heated with stirring at 85° C. for 3 hours. The bubble viscosity (the viscosity measured by a Gardner Bubble Viscometer) rose from U to Z, and a dispersing agent [I] colored to pale orange red was obtained.

When this product was analyzed by infrared absorption spectroscopy, it showed a decreased absorption intensity of the amino group and the methylol group as compared with a blend of the melamine resin (A) and the silane coupling agent.

The dispersing agent [I] was diluted to a solids content of 25% with a 1:1 (by weight) mixture of xylene and n-butanol, and in a mayonnaise bottle, was added in an amount of 48 parts to 120 part of rutile titanium white and in an amount of 60 parts to 12 parts of furnace carbon black. To each of the mixtures were added 150 parts of hard alumina beads having a diameter of 4 mm. By using a shaker, the titanium white was dispersed for 1 hour, and the carbon black was dispersed for 2 hours, respectively. After the dispersion, the dispersing agent [I] was further added in an amount of 24 parts to the titanium white paste and in an amount of 30 parts to the carbon black paste to form a stabilized titanium white paste (C) and a stabilized carbon black paste (D). To 140 parts of the titanium white paste (C) were added 87.5 parts of a 60% solution of coconut oil-modified alkyd resin and 29.2 parts of the 60% solution of melamine resin (A), and the carbon black paste (D) was further added to form a gray color paint (E).

The pastes (C) and (D) were each analyzed by a rotary centrifugal particle size distribution tester. It was found that the titanium white had a median particle diameter of 0.35 micron, and the carbon black had a median particle diameter of 0.08 micron.

The pastes (C) and (D) were mixed with the titanium white/carbon black weight ratio being varied within the range of from 10:1 to 1:10, and the mixture was diluted with a 1:1 (by weight) mixture of xylene and n-butanol so that the proportion of the mixed pigment reached 1% by volume. The mixture was left to stand in a test tube for sedimentation stability. It was found that the state of dispersion was stable for a long period of time at any of the mixing ratios.

The paint (E) was coated on a steel panel by a roll coater and a bar coater respectively. Since the dispersed state of carbon black in the paint was good, the color development for black tint in the gray coating was improved, and the gloss of the coated surface was excellent.

There was no difference in the degree of color development for black tint between the roll coating and the bar coating, and thus no appreciable difference existed in color development depending upon the variations in the operative shear rate of the coates.

The paint (E) was stored indoors for one month, and then coated by the same method as above. The color of the painted film was scarcely different from that obtained when the paint immediately after preparation was used.

COMPARATIVE EXAMPLE 1

A 60% solution of isobutanol-modified melamine resin (A) was used instead of the dispersing agent [I], and the same test as in Example 1 was conducted using the same dispersing conditions and mixing formulation as in Example 1. It was found that the median particle diameter of titanium white was 0.47 micron, and the median particle diameter of carbon black was 0.2 micron.

In the sedimentation test in a test tube, a black layer and a white layer completely separated from each other and sedimented early. When the paint was coated by the same method as in Example 1, the color development for black tint was inferior to that in Example 1, and the degree of color development varied markedly between the bar coater application and the roll coater application depending upon the difference of operative shear rate.

EXAMPLE 2

The 25% solids dispersing agent [I] was added in an amount of 48 parts to 120 parts of red iron oxide and in an amount of 60 parts to 24 parts of copper phthalocyanine blue, and 150 parts of alumina beads having a diameter of 4 mm was added to each of the resulting mixtures. By using a shaker, the red iron oxide was dispersed for 1 hour and the copper phthalocyanine blue was dispersed for 2 hours, respectively. In the red iron oxide paste, the median particle diameter of the pigment was 0.18 micron, and in the copper phthalocyanine blue paste, the median particle diameter of the pigment was 0.16 micron.

The sedimentation stability of the pastes was tested in the same way as in Example 1. It was found that the dispersion was stable for a long period of time.

For comparison, a 60% solution of isobutanol-modified melamine resin (A) was diluted to a solids content of 25%, and each of the above pigments was dispersed in it. In the resulting pigment dispersions, the median particle diameter of red iron oxide was 0.85 micron, and the median particle diameter of copper phthalocyanine blue was 1.2 microns.

EXAMPLE 3

To 100 parts of a 60% solution of isobutanol-modified melamine resin (A) was added 6 parts of a silane coupling agent A-1100 (a tradename for gamma-aminopropyltriethoxysilane manufactured by Nippon Unicar Co., Ltd. Japan), and the mixture was heated at 85° C. for 4 hours and 20 minutes. The bubble viscosity rose from N to P-Q to form a dispersing agent [II].

The dispersing agent [II] was diluted to a solids content of 25% with a 1:1 (by weight) mixture of xylene and n-butanol, and rutile titanium white and furnace carbon black were each dispersed therein by using the same mixing formulation and dispersing conditions as in Example 1. The resulting pigment pastes were tested for sedimentation in a test tube and for color development in the same way as in Example 1. It was found that the state of dispersion of the pigments was stable, and the paint showed high tinting strength and hiding power. Even when it was coated by varying operative shear rate in the same way as above, the degree of color development was very uniform among two samples.

EXAMPLE 4

To 100 parts of a 60% solution of a benzoguanamine resin (B) was added 6 parts of a silane coupling agent KBM-603, and the mixture was heated at 85° C. for 4 hours. The bubble viscosity rose from B+ to E+ to form a dispersing agent [III]. The dispersing agent [III] was tested in the same way as in the case of the dispersing agents [I] and [II]. It was found that the dispersing agent [III] showed the same superior pigment dispersibility as in Examples 1 and 3.

EXAMPLE 5

100 Parts of a 50% solution of soybean oil-modified alkyd resin (oil length 41%; acid value 5) and 5 parts of a silane coupling agent A-1120 [a tradename for N-beta-(aminoethyl)-gamma-aminopropyltrimethoxysilane manufactured by Nippon Unicar Co., Ltd. Japan] were heated at 90° C. for 3 hours with stirring. The bubble viscosity rose from O to T to form a dispersing agent [IV] colored to pale red orange.

The dispersing agent [IV] was diluted to a solids content of 25% with a 1:1 (by weight) mixture of xylene and n-butanol, and in a mayonnaise bottle, was added in an amount of 48 parts to 120 parts of rutile titanium white and in an amount of 60 parts to 12 parts of furnace carbon black. To each of the resulting mixtures were added 150 parts of hard alumina beads having a diameter of 4 mm, and by using a shaker, the titanium white was dispersed for 1 hour and the carbon black was dispersed for 2 hours, respectively. After the dispersion, a 50% solution of soybean oil-modified alkyd resin was added in an amount of 24 parts to the titanium white paste and in an amount of 30 parts to the carbon black paste to afford a stabilized titanium white paste and a stabilized carbon black paste. These pastes were analyzed by a rotary centrifugal particle size distribution tester. It was found that the titanium white had a median particle diameter of 0.34 micron, and the carbon black had a median particle diameter of 0.09 micron.

In the same way as in Example 1, pastes were prepared by varying the ratio of titanium white to carbon black, and each of the resulting pastes was diluted with a 1:1 (by weight) mixture of xylene and n-butanol so that the amount of the mixed pigment reached 1% by volume. The paste was then left to stand in a test tube for sedimentation stability. At any of the mixing ratios, the state of dispersion was stable for a long period of time.

To 140 parts of the stabilized titanium white paste were added 87.5 parts of a 50% solution of soybean oil-modified alkyd resin and 29.2 parts of a 60% solution of butanol-modified melamine resin to form a white paint. To the white paint was added the above stabilized carbon black paste to form a gray color paint.

The gray color paint was coated on a steel panel in the same was as in Example 1. The coated film had good color development for black tint and gloss. Even when the coating was performed in the same way as described hereinabove at varying operative shear rates, the degree of color development was uniform among two samples. When the gray paint was stored in the same way as in Example 1 and then coated, no difference was seen in the color of the coated film after storage.

COMPARATIVE EXAMPLE 2

A 50% solution of soybean oil-modified alkyd resin diluted to a solids content of 25% was used instead of the dispersing agent [IV], and the same test as in Example 5 was performed using the same mixing formulation and dispersing conditions as in Example 5. It was found that titanium white had a median particle diameter of 0.42 micron, and carbon black had a median particle diameter of 0.25 micron. In a sedimentation test in a test tube, a black layer and a white layer separated from each other completely and sedimented early. In applying the gray paint, the degree of color development for black tint was inferior to that in Example 5, and the degree of color development varied greatly depending upon variations in operative shear rate of the coaters.

EXAMPLE 6

The dispersing agent [IV] was added in an amount of 48 parts to 120 parts of red iron oxide and in an amount of 60 parts to 24 parts of copper phthalocyanine blue, and to each of the resulting mixtures added 150 parts of hard alumina beads having a diameter of 4 mm. By using a shaker, the red iron oxide was dispersed for 1 hour, and the copper phthalocyanine blue was dispersed for 2 hours, respectively. It was found that the dispersed particles of red iron oxide had a median particle diameter of 0.18 micron, and the dispersed particles of copper phthalocyanine blue had a median particle diameter of 0.09 micron.

The same tests for sedimentation stability and coating as in Example 5 were performed. It was found that the state of dispersion was stable for a long period of time, and color development was good.

For comparison, when a 50% solution of soybean oil-modified alkyd resin diluted to a solids content of 25% was used instead of the dispersing agent (IV) and the above pigments were dispersed in it, the dispersed particles of these pigments were found to have a median particle diameter of 0.52 micron and 0.35 micron, respectively.

EXAMPLE 7

To 100 parts of a 60% solution of phenolic resin-modified alkyd resin (oil length 52%, acid value 4.6) was added 10 parts of a silane coupling agent A-1160 (a tradename for gamma-ureidopropyltriethoxysilane manufactured by Nippon Unicar Co., Ltd. Japan), and the mixture was heated at 80° C. for 3 hours with stirring. The bubble viscosity rose from U to Y to form a dispersing agent [V] colored to pale orange color.

The dispersing agent [V] was diluted to a solids content of 25% with a 1:1 (by weight) mixture of xylene and n-butanol. By using the same mixing formulation and dispersing conditions as in Example 5, rutile titanium white and furnace carbon black were each dispersed. The pigment pastes obtained were tested in the same way as in Example 5. It was found that in a sedimentation test in a test tube, the state of dispersion was stable for a long period of time, the degree of color development for black tint in coating was great and the hiding powder of the gray paint was high. Besides, the degree of color development was very uniform even when the coating was carried out at varying operative shear rates.

EXAMPLE 8

To 100 parts of a 55% solution of acrylic resin (A) (a copolymer having a number average molecular weight of about $1.2 \times 10^4$ derived from 20 parts of styrene, 50 parts of 2-ethylhexyl methacrylate, 10 parts of 2-hydroxyethyl methacrylate, 17 parts of methyl methacrylate and 3 parts of methacrylic acid) was added 10 parts of a silane coupling agent A-1160, and the mixture was heated at 80° C. for 3 hours with stirring. The bubble viscosity rose from W to Z to form a dispersing agent [VI] colored to pale orange.

The dispersing agent [VI] was diluted to a solids content of 25% by with a 1:1 (by weight) mixture of xylene and n-butanol, and in a mayonnaise bottle, was added in an amount of 48 parts to 120 parts of rutile titanium white and in an amount of 60 parts to 12 parts of furnace carbon black. To each of the resulting mixtures was added 150 parts of hard alumina beads having a particle diameter of 4 mm. By using a shaker, the titanium white was dispersed for 1 hour, and the carbon black was dispersed for 2 hours, respectively. After the dispersion, the 55% solution of acrylic resin (A) was added in an amount of 24 parts to the titanium white paste and in an amount of 30 parts to the carbon black paste to form a stabilized titanium white paste and a stabilized carbon black paste. The pastes were analyzed by a rotary centrifugal size distribution tester, and it was found that the dispersed particles of titanium white had a median particle diameter of 0.32 micron, and the dispersed particles of carbon black had a median particle diameter of 0.10 micron.

Pastes were prepared by mixing the titanium white paste and the carbon black paste with varying titanium white/carbon black ratios in the same way as in Example 1 and were each left to stand in a tube after dilution with a 1:1 (by weight) mixture of xylene and n-butanol so that the proportion of the mixed pigment reached 1% by volume. The state of dispersion was stable for a long period of time at any of the mixing ratios.

To 140 parts of the stabilized titanium white paste obtained as above were added 87.5 parts of the 55% solution of acrylic resin (A) and 29.2 parts of a 60% solution of butanol-modified melamine resin. The stabilized carbon black paste obtained as above was added to form a gray color paint.

The gray color paint was coated on a steel panel in the same way as in Example 1. The color development for black tint and the gloss of the coated surface were both good, and even when the coating was performed at varying operative shear rates, there was no appreciable difference in color development. When the paint was stored and then applied by the same method as in Example 1, no change in the color of the coated film was noted after storage.

COMPARATIVE EXAMPLE 3

The 55% solution of acrylic resin (A) used in Example 8 was used instead of the dispersing agent [VI] after diluting it to a solids content of 25%. The same test as in Example 8 was performed using the same mixing formulation and dispersing conditions as in Example 8. It was found that the titanium white had a median particle diameter of 0.41 micron, and the carbon black had a median particle diameter of 0.32 micron. In a sedimentation test in a test tube, a black layer and a white layer separated from each other completely, and sedimented early. In coating, the color development for black tint was inferior to that in Example 8, and when the coating was performed at varying operative shear rates, the degree of color development changed markedly.

EXAMPLE 9

The dispersing agent [VI] having a solids content of 25% was added in an amount of 48 parts to 120 parts of red iron oxide, and in an amount of 60 parts to 24 parts of copper phthalocyanine blue, and to each of the mixtures were added 150 parts of alumina beads having a diameter of 4 mm. By using a shaker, the red iron oxide was dispersed for 1 hour, and the copper phthalocyanine blue was dispersed for 2 hours, respectively. It was found that the dispersed particles of the red iron oxide had a median particle diameter of 0.20 microns and the dispersed particles of copper phthalocyanine blue had a median particle diameter of 0.12 micron.

In the same way as in Example 8, a test for sedimentation stability was performed. The state of dispersion was stable for a long period of time.

For comparison, the 55% solution of acrylic resin (A) diluted to a solids content of 25% was used instead of the dispersing agent (VI), and the pigments were dispersed. It was found tht the pigments had a median particle diameter of 0.79 micron and 0.90 micron, respectively.

EXAMPLE 10

To 100 parts of a 55% solution of acrylic resin (B) (an acrylic copolymer having a number average molecular weight of about $9 \times 10^3$ derived from 30 parts of methyl methacrylate, 40 parts of butyl methacrylate, 20 parts of N-methylol methacrylamide, 8 parts of 2-hydroxyethyl acrylate and 2 parts of acrylic acid) was added 10 parts of a silane coupling agent KBE-903 (a tradename for gamma-aminopropyltriethoxysilane manufactured by Shinetsu Chemical Industry Co., Ltd. Japan), and the mixture was heated at 85° C. for 2 hours. The bubble viscosity rose from X to $Z_2$ to form a dispersing agent [VII] colored to pale orange.

The dispersing agent (VII) was diluted to a solids content of 25% with a 1:1 (by weight) mixture of xylene and n-butanol, and rutile titanium white and furnace carbon black were dispersed in it by using the same mixing formulation and method as in Example 8. In a sedimentation test in a test tube, the state of dispersion was stable for a long period of time. In the coating of a gray paint prepared from the dispersion, the color development for black tint was good, and the hiding power of the coating was high. Even when the coating was performed at varying operative shear rates, a very uniform color development was obtained.

EXAMPLE 8

Fifty parts of a 50% solution of soybean oil-modified alkyd resin (oil length 41%, acid value 5), 50 parts of a 60% solution of isobutanol-modified melamine resin (A) and 5 parts of a silane coupling agent A-1120 were heated at 90° C. for 3 hours with stirring. The bubble viscosity rose from Q to V to form a dispersing agent (VIII) colored to pale red orange.

The dispersing agent (VIII) was diluted to a solids content of 25% with a 1:1 (by weight) mixture of xylene and n-butanol, and in a mayonnaise bottle, was added in an amount of 48 parts to 120 parts of titanium white and in an amount of 60 parts to 12 parts of furnace carbon black. To each of the mixtures 150 parts of hard alumina beads having a diameter of 4 mm were added. By using a shaker, the titanium white was dispersed for 1 hour, and the carbon black was dispersed for 2 hours, respectively. After the dispersion, a 50% solution of soybean oil-modified alkyd resin was added in an amount of 24 parts to the titanium white paste and in an amount of 30 parts to the carbon black paste to form a stabilized titanium white paste and a stabilized carbon black paste.

The stabilized pastes were analyzed by a rotary centrifugal particle size distribution tester. It was found that the titanium white had a median particle diameter of 0.28 micron and the carbon black had a median particle diameter of 0.07 micron. The pastes were mixed in the same way as in Example 1 by varying the titanium white/carbon black ratio. Each of the resulting mixtures was diluted with a 1:1 (by weight) mixture of xylene and n-butanol so that the amount of the mixed pigment reached 1% by volume. It was then left to stand in a test tube. The state of dispersion was stable for a long period of time at any of the mixing ratios.

To 140 parts of the stabilized titanium white paste were added 117 parts of a 50% solution of soybean oil-modified alkyd resin and 29.2 parts of a 60% solution of isobutanol-modified melamine resin (A) to form a white paint. Then, the stabilized carbon black paste was added to form a gray color paint.

The gray color paint was coated on a steel panel in the same way as in Example 1. The color development for black tint and gloss of the coated surface were both good. Even when the coating was performed at varying operative shear rates, the color development was uniform.

When the gray paint was stored and then coated in the same way as in Example 1, no change in the color of the coated surface was noted after storage.

COMPARATIVE EXAMPLE 3

The soybean oil-modified alkyd resin solution (solids content 25%) used in Example 11 was used instead of the dispersing agent [VIII], and the same test as in Example 11 was performed by using the same mixing formulation and dispersing conditions as in Example 11. It was found that titanium white had a median particle diameter of 0.42 micron, and carbon black had a median particle diameter of 0.25 micron. In a sedimentation test in a test tube, a black layer and a white layer separated from each other completely and sedimented early. The color development for black tint was inferior to that in Example 11, and the degree of color development changed markedly depending upon the variations in operative shear rate of the coaters.

COMPARATIVE EXAMPLE 4

The isobutanol-modified melamine resin solution (adjusted to a solids content 25%) used in Example 11 was used instead of the dispersing agent [VIII], and the same test as in Comparative Example 4 was performed. It was found that the titanium white had a median particle diameter of 0.47 micron, and the carbon black had a median particle diameter of 0.20 micron. In a sedimentation test in a test tube, a white layer and a black layer separated from each other and sedimented early, and the color development for black tint in the coated film was inferior. Moreover, the degree of color development changed markedly depending upon the variations in operative shear rate of the coaters.

EXAMPLE 9

The dispersing agent (VIII) having a solids content of 25% which was used in Example 11 was added in an amount of 48 parts to 120 parts of red iron oxide, and in an amount of 60 parts to 24 parts of copper phthalocyanine blue, and to each of the resulting mixtures were added 150 parts of hard alumina beads having a diameter of 4 mm. By using a shaker, the red iron oxide was dispersed for 1 hour, and the copper phthalocyanine blue was dispersed for 2 hours, respectively. It was found that the red iron oxide was stably dispersed to a median particle diameter of 0.12 micron, and the copper phthalocyanine blue was stably dispersed to a median particle diameter of 0.09 micron.

For comparison, when the pigments were dispersed in a solution of soybean oil-modified alkyd resin diluted to a solids content of 25%, these pigments had a median particle diameter of 0.52 and 0.35 microns, respectively. When these pigments were dispersed in a solution of isobutanol-modified melamine resin diluted to a solids content of 25%, they had a median particle diameter of 0.85 and 1.2 microns, respectively.

EXAMPLE 10

Fifty parts of a 60% solution of benzoguanamine resin was added to 50 parts of a 60% solution of phenolic resin-modified alkyd resin (oil length 52%, acid value 4.6), and the mixture was heated at 80° C. for 2 hours with stirring. The bubble viscosity rose from J to N. When 10 parts of a silane coupling agent A-1160 was added to the solution, its bubble viscosity changed to L. When the solution was further heated at 80° C. for 2 hours with stirring, its bubble viscosity rose to P to give a dispersing agent (IX) colored to pale orange.

The dispersing agent (IX) was diluted to a solids content of 25% with a 1:1 (by weight) mixture of xylene and n-butanol, and by using the same mixing formulation and method as in Example 1, rutile titanium white and furnace carbon black were each dispersed. In a sedimentation test in a test tube, the state of dispersion was stable for a long period of time. In coating a gray color paint prepared from the dispersion, the coated film showed good color development for black tint and high hiding power. Even when the coating was performed at varying operative shear rates, color development was very uniform.

EXAMPLE 11

Forty parts of the same 60% solution of isobutanol-modified melamine resin as used in Example 1 was added to 60 parts of the same 55% solution of acrylic resin as used in Example 8, and the mixture was heated at 80° C. for 2 hours with stirring. The bubble viscosity rose from V to Z. When 10 parts of a silane coupling agent A-1160 was added to the solution, the bubble viscosity decreased to X. When the solution was then heated at 80° C. for 2 hours with stirring, its bubble viscosity increased to $Z_1$ to give a dispersing agent (X) colored to pale orange.

The dispersing agent (X) was diluted to a solids content of 25% with a 1:1 (by weight) mixture of xylene and n-butanol, and in a mayonnaise bottle, was added in an amount of 48 parts to 120 parts of rutile titanium white, and in an amount of 60 parts to 12 parts of furnace carbon black. To each of the resulting mixtures were added 150 parts of hard alumina beads having a diameter of 4 mm. By using a shaker, the titanium white was dispersed for 1 hour, and the carbon black was dispersed for 2 hours, respectively. After the dispersing, the same 55% solution of acrylic resin as above was added in an amount of 24 parts to the titanium white paste and in an amount of 30 parts to the carbon black paste to form a stabilized titanium white paste and a carbon black paste. The stabilized pastes were analyzed by a rotary centrifugal particle size distribution tester, and it was found that the titanium white had a median particle diameter of 0.29 micron, and the carbon black had a median particle diameter of 0.08 micron.

Pastes were prepared in the same way as in Example 1 by varying the ratio of titanium white to carbon black, and were each diluted with a 1:1 (by weight) mixture of xylene and n-butanol so that the proportion of the mixed pigment reached 1% by volume. When the diluted pastes were each left to stand in a test tube, the state of dispersion was stable for a long period of time at any of the mixing ratios.

To 140 parts of the stabilized titanium white paste were added 87.5 parts of a 55% solution of acrylic resin (A), 29.2 parts of a 60% solution of isobutanol-modified melamine resin (A), and the stabilized carbon black paste obtained as above was also added to prepare a gray color paint.

A coated film prepared from the gray color paint by the same method as in Example 1 showed good color development for black tint and gloss, and even when the coating was performed at varying operative shear rates, the degree of color development was uniform. When the gray color paint was stored and then coated under the same conditions as in Example 1, the resulting coated film did not show a change in color after storage.

COMPARATIVE EXAMPLE 5

The acrylic resin solution (adjusted to a solids content of 25%) used in Example 14 was used instead of the dispersing agent (X), and the same test as in Example 14 was performed using the same mixing formulation and dispersing conditions as in Example 14. It was found that titanium white had a median particle diameter of 0.41 micron, and carbon black had a median particle diameter of 0.32 micron. In a sedimentation test in a test tube, a black layer and a white layer separated from each other completely, and sedimented early. In the coating of a gray color paint prepared as in Example 1, the color development for black tint was inferior to that in Example 14, and the degree of color development varied considerably with changes in operative shear rate of the coaters.

COMPARATIVE EXAMPLE 6

The isobutanol-modified melamine resin solution (A) (adjusted to a solids content of 25%) used in Example 14 was used instead of the dispersing agent (X), and the same test as in Comparative Example 6 was performed. It was found that titanium white had a median particle diameter of 0.47 micron, and carbon black had a median particle diameter of 0.20 micron. In a sedimentation test performed in the same way as in Comparative Example 6, these pigments sedimented early as in Comparative Example 6. In coating a gray color paint prepared by using the resulting pigment dispersion, the color development for black tint was inferior, and the degree of color development varied considerably with changes in operative shear rate of the coaters.

EXAMPLE 12

The 25% solids dispersing agent (X) used in Example 14 was added in an amount of 48 parts to 120 parts of red iron oxide, and in an amount of 60 parts to 24 parts of copper phthalocyanine blue. To each of the resulting mixtures were added 150 parts of hard alumina beads having a diameter of 4 mm. By using a shaker, the red iron oxide was dispersed for 1 hour, and the copper phthalocyanine blue was dispersed for 2 hours, respectively. It was found that the red iron oxide and the copper phthalocyanine blue were finely dispersed to a median particle diameter of 0.14 micron and 0.08 micron, respectively.

For comparison, when these pigments were dispersed in a solution of acrylic resin (A) (adjusted to a solids content of 25%), the median particle diameters of these pigments were 0.79 micron and 0.90 micron, respectively. When the pigments were disposed in a solution of isobutanol-modified melamine resin (adjusted to a solids content of 25%), the median particle diameters of these pigments were 0.85 micron and 1.2 microns, respectively.

EXAMPLE 13

Fifty parts of the same 55% acrylic resin solution (B) as described in Example 10, 50 parts of a 60% solution of benzoguanamine resin (B) and 10 parts of a silane coupling agent KBE 903 were mixed and heated at 80° C. for 3 hours. The bubble viscosity rose from U to X to give a dispersing agent (XI) colored to pale orange.

The dispersing agent (XI) was diluted to a solids content of 25% with a 1:1 (by weight) mixture of xylene and n-butanol, and rutile titanium white and furnace carbon black were dispersed by using the same mixing formulation and method as in Example 14. In a sedimentation test in a test tube, the state of dispersion was stable for a long period of time. In a coated film prepared from a gray color paint formed by using the above pigment dispersion, the color development for black tint was excellent and the coating had high hiding power. When the coating was performed at varying operative shear rates, a very uniform color development was obtained.

What we claim is:

1. In a pigment dispersion comprising a pigment, a dispersing agent and an organic dispersing medium, the improvement wherein the dispersing agent is the reaction product of both an alkyd resin and an amino resin with a silane coupling agent.

2. The pigment dispersion of claim 1 wherein the silane coupling agent is an organofunctional silane represented by the general formula $$RSi(OX)_{4-n}Y_{n-1}$$

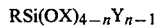

wherein n is an integer of 1 to 3, X represents an alkyl group having 1 to 18 carbon atoms, a phenyl group or an alkoxyalkyl group of the formula —R'OR" in which R' represents an alkyl group having 2 to 3 carbon atoms and R" represents an alkyl group having 1 to 18 carbon atoms, Y represents an alkyl group having 1 to 18 carbon atoms, and R represents an epoxy group, an amino group, a urea group, a mercapto group, a halogen atom or an organic group having an ethylenically unsaturated double bond.

3. The pigment dispersion of claim 1 wherein the dispersing agent is the reaction product of 100 parts by weight of the amino resin or modified alkyld resin with 1 to 100 parts by weight of the silane coupling agent.

4. The pigment dispersion of claim 1 wherein the dispersing agent is the reaction product of 100 parts by weight of an alkyd-amino resin composed of 5 to 95% by weight of the alkyd resin and 95 to 5% by weight of the amino resin with 1 to 100 parts by weight of the silane coupling agent.

5. The pigment dispersion of claim 1 wherein the dispersing agent is the reaction product of 100 parts by weight of an acrylic-amino resin composed of 5 to 95% by weight of the acrylic resin and 95 to 5% by weight of the amino resin with 1 to 100 parts by weight of the silane coupling agent.

* * * * *